United States Patent
Ding (10) Patent No.: US 12,361,087 B2
(45) Date of Patent: Jul. 15, 2025

(54) CONTENT DISPLAY ADJUSTMENT

(71) Applicant: Shanghai Bilibili Technology Co., Ltd., Shanghai (CN)

(72) Inventor: Jiajun Ding, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 432 days.

(21) Appl. No.: 16/586,630

(22) Filed: Sep. 27, 2019

(65) Prior Publication Data

US 2020/0104338 A1  Apr. 2, 2020

(30) Foreign Application Priority Data

Sep. 27, 2018  (CN) .................. 201811143713.8

(51) Int. Cl.
*G06F 16/9538* (2019.01)
*G06F 16/958* (2019.01)
*G06F 40/106* (2020.01)

(52) U.S. Cl.
CPC ........ *G06F 16/9538* (2019.01); *G06F 16/958* (2019.01); *G06F 40/106* (2020.01)

(58) Field of Classification Search
CPC ... G06F 16/9538; G06F 16/958; G06F 40/106
See application file for complete search history.

(56) References Cited

U.S. PATENT DOCUMENTS

| | | | | |
|---|---|---|---|---|
| 9,213,749 | B1 * | 12/2015 | Collins | G06F 16/248 |
| 2013/0169669 | A1 * | 7/2013 | Chen | G09G 5/00 |
| | | | | 345/619 |
| 2016/0132922 | A1 * | 5/2016 | Wang | G06F 16/345 |
| | | | | 715/765 |
| 2016/0266749 | A1 * | 9/2016 | Kennedy, Jr. | G06F 40/106 |
| 2017/0010788 | A1 * | 1/2017 | Srinivasaraghavan | ...... |
| | | | | H04N 21/4828 |
| 2017/0052937 | A1 * | 2/2017 | Sirven | G06F 40/295 |
| 2017/0094360 | A1 * | 3/2017 | Keighran | H04N 21/4758 |
| 2017/0220206 | A1 * | 8/2017 | Horn | G06F 16/9038 |
| 2017/0329468 | A1 * | 11/2017 | Schon | G06F 3/0483 |

FOREIGN PATENT DOCUMENTS

| | | |
|---|---|---|
| CN | 101385028 A | 3/2009 |
| CN | 101540858 A | 9/2009 |
| CN | 102411614 A | 4/2012 |
| CN | 103649895 A | 3/2014 |
| CN | 106610984 A | 5/2017 |
| CN | 107391725 A | 11/2017 |

* cited by examiner

*Primary Examiner* — Ann J Lo
*Assistant Examiner* — Fernando M Mari Valcarcel
(74) *Attorney, Agent, or Firm* — BakerHostetler (57) ABSTRACT

Techniques for simultaneously displaying a list of items and content associated with a selected item are described herein. The disclosed techniques include detecting a selection of an item among a plurality of items; obtaining webpage content associated with a selected item; converting a display mode of the list of search results to a single-column mode; determining items to be displayed among the plurality of items based at least in part on a position of the selected item in the plurality of items; and displaying a list of the determined items and the webpage content associated with the selected item on the same screen.

18 Claims, 12 Drawing Sheets

CONTENT DISPLAY ADJUSTMENT

CROSS-REFERENCE TO RELATED APPLICATION

The present application claims priority of Chinese patent application No. 201811143713.8, filed on Sep. 27, 2018. The entire disclosure of the above-identified application is hereby incorporated by reference herein and made a part of this specification.

BACKGROUND

When a user searches for web pages in the Internet, a search list with item is often generated according to the search results. By clicking a link of one item in the search list, a page redirects to the detail page of the item. When another object in the search list needs to be clicked, the search list needs to be redirected to the page of the search list.

BRIEF DESCRIPTION OF THE DRAWINGS

The following detailed description may be better understood when read in conjunction with the appended drawings. For purposes of illustration, there are shown in the drawings example embodiments of various aspects of the disclosure; however, the disclosure is not limited to the specific methods and instrumentalities disclosed.

DETAILED DESCRIPTION OF ILLUSTRATIVE EMBODIMENTS

Figure 1:
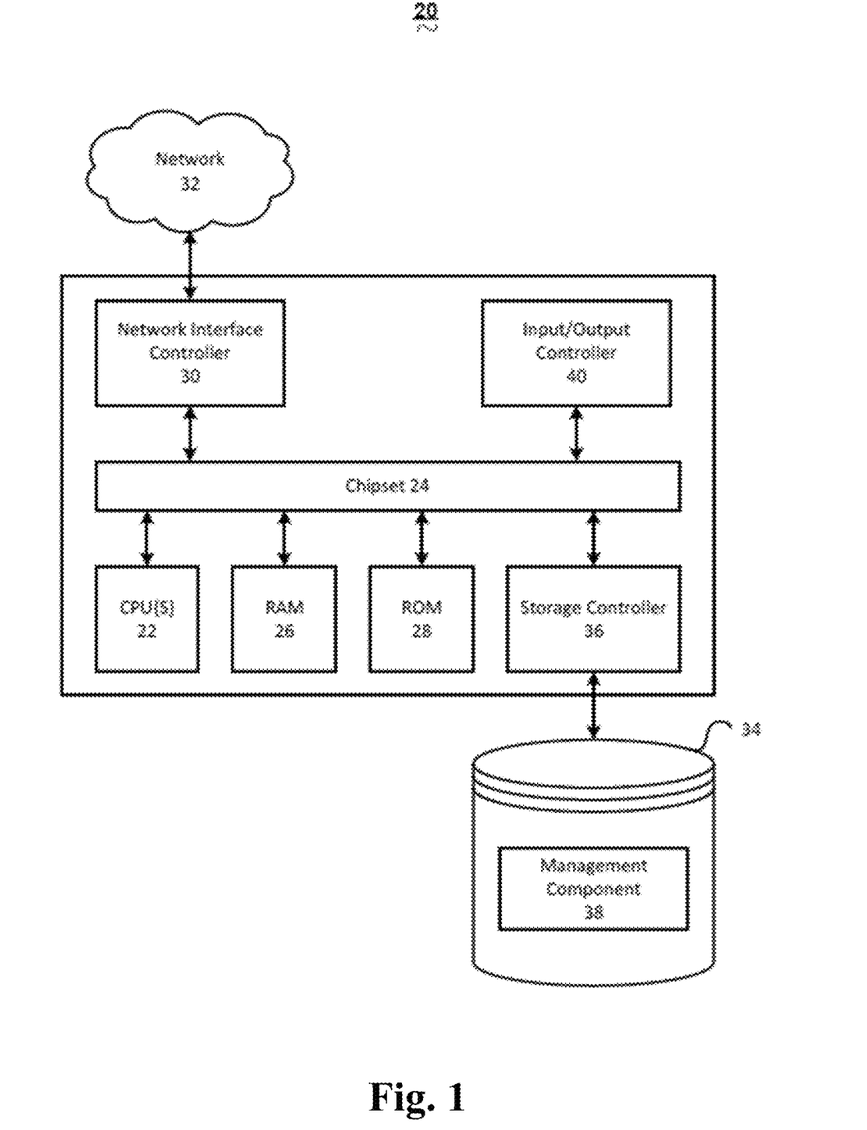
FIG. 1 is a schematic diagram illustrating an example computing device that may be used in accordance with the present disclosure.

FIG. 1 depicts a computing device that may be used in various aspects, such as the services, networks, and/or clients. The computer architecture shown in FIG. 1 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

A computing device 20 may include a baseboard, or "motherboard," which is a printed circuit board to which a multitude of components or devices may be connected by way of a system bus or other electrical communication paths. One or more central processing units (CPUs) 22 may operate in conjunction with a chipset 24. The CPU(s) 22 may be standard programmable processors that perform arithmetic and logical operations necessary for the operation of the computing device 20.

The CPU(s) 22 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 22 may be augmented with or replaced by other processing units, such as GPU(s). The GPU(s) may comprise processing units specialized for but not necessarily limited to highly parallel computations, such as graphics and other visualization-related processing.

A chipset 24 may provide an interface between the CPU(s) 22 and the remainder of the components and devices on the baseboard. The chipset 24 may provide an interface to a random access memory (RAM) 26 used as the main memory in the computing device 20. The chipset 24 may further provide an interface to a computer-readable storage medium, such as a read-only memory (ROM) 28 or non-volatile RAM (NVRAM) (not shown), for storing basic routines that may help to start up the computing device 20 and to transfer information between the various components and devices. ROM 28 or NVRAM may also store other software components necessary for the operation of the computing device 20 in accordance with the aspects described herein.

The computing device 20 may operate in a networked environment using logical connections to remote computing nodes and computer systems through local area network (LAN). The chipset 24 may include functionality for providing network connectivity through a network interface controller (NIC) 30, such as a gigabit Ethernet adapter. A NIC 30 may be capable of connecting the computing device 20 to other computing nodes over a network 32. It should be appreciated that multiple NICs 30 may be present in the computing device 20, connecting the computing device to other types of networks and remote computer systems.

The computing device 20 may be connected to a mass storage device 34 that provides non-volatile storage for the computer. The mass storage device 34 may store system programs, application programs, other program modules, and data, which have been described in greater detail herein. The mass storage device 34 may be connected to the computing device 20 through a storage controller 36 connected to the chipset 24. The mass storage device 34 may consist of one or more physical storage units. The mass storage device 34 may comprise a management component 38. A storage controller 36 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 20 may store data on the mass storage device 34 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 34 is characterized as primary or secondary storage and the like.

For example, the computing device 20 may store information to the mass storage device 34 by issuing instructions through a storage controller 36 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 20 may further read information from the mass storage device 34 by detecting the physical states or characteristics of one or more particular locations within the physical storage units.

In addition to the mass storage device 34 described above, the computing device 20 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 20.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 34 depicted in FIG. 1, may store an operating system utilized to control the operation of the computing device 20. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 34 may store other system or application programs and data utilized by the computing device 20.

The mass storage device 34 or other computer-readable storage media may also be encoded with computer-executable instructions, which, when loaded into the computing device 20, transforms the computing device from a general-purpose computing system into a special-purpose computer capable of implementing the aspects described herein. These computer-executable instructions transform the computing device 20 by specifying how the CPU(s) 22 transition between states, as described above. The computing device 20 may have access to computer-readable storage media storing computer-executable instructions, which, when executed by the computing device 20, may perform the methods described herein.

A computing device, such as the computing device 20 depicted in FIG. 1, may also include an input/output controller 40 for receiving and processing input from a number of input devices, such as a keyboard, a mouse, a touchpad, a touch screen, an electronic stylus, or other type of input device. Similarly, an input/output controller 40 may provide output to a display, such as a computer monitor, a flat-panel display, a digital projector, a printer, a plotter, or other type of output device. It will be appreciated that the computing device 20 may not include all of the components shown in FIG. 1, may include other components that are not explicitly shown in FIG. 1, or may utilize an architecture completely different than that shown in FIG. 1.

As described herein, a computing device may be a physical computing device, such as the computing device 20 of FIG. 1. A computing node may also include a virtual machine host process and one or more virtual machine instances. Computer-executable instructions may be executed by the physical hardware of a computing device indirectly through interpretation and/or execution of instructions stored and executed in the context of a virtual machine.

Figure 2:
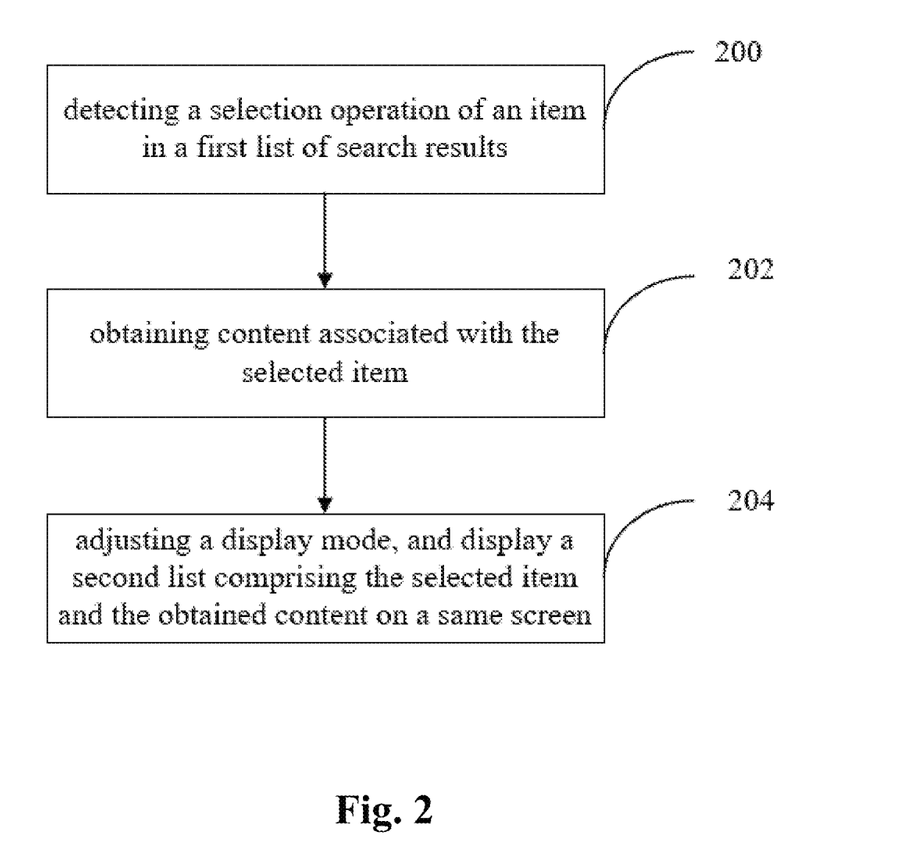
FIG. 2 is a flowchart illustrating an example method for adjusting a list display in accordance with the present disclosure.

Please refer to FIG. 2, which is a flowchart illustrating an example method for adjusting a list display in accordance with the present disclosure. In an embodiment, the method may include blocks 200~204.

At block 200, detecting a selection operation of an item in a first list of search results.

At block 202, obtain webpage content associated with a selected item corresponding to the selection operation.

At block 204, adjusting a display mode of the first list to become a second list, and the second list comprising the selected item and the obtained webpage content are displayed on a same screen.

Figure 3:
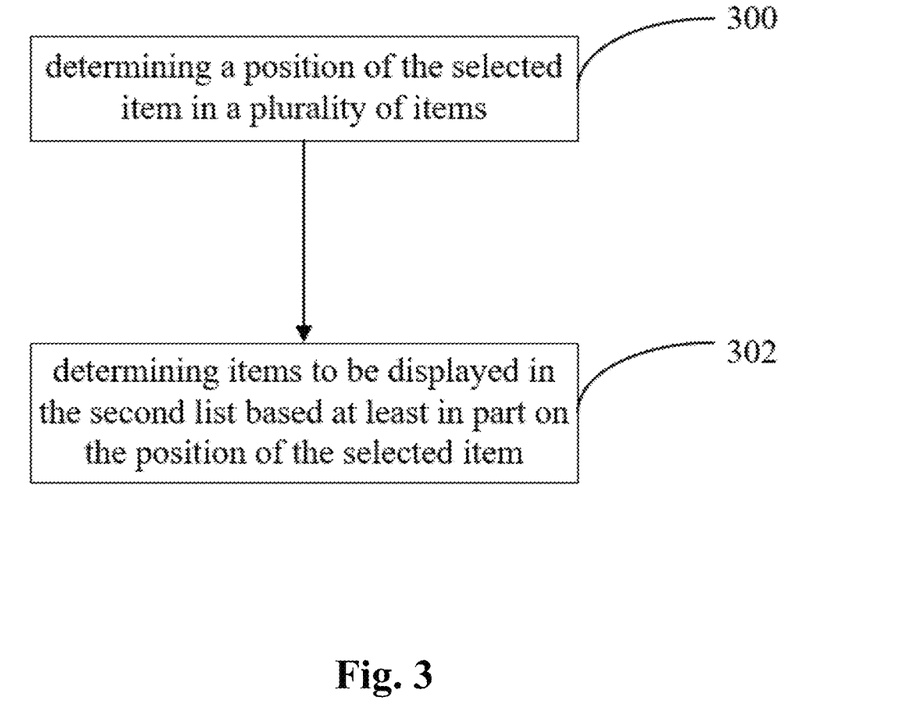
FIG. 3 is a schematic diagram illustrating an example process of adjusting a display mode of a first list to become a second list in accordance with the present disclosure.

In one exemplary embodiment, as illustrated in FIG. 3, the block 204 may include block 300 and block 302.

At block 300, determining a position of the selected item in a plurality of items.

At block 302, determining the display range of the second list based at least in part on the position of the selected item so as to adapt the second list to the display page and display the selected item in the second list.

Figure 4:
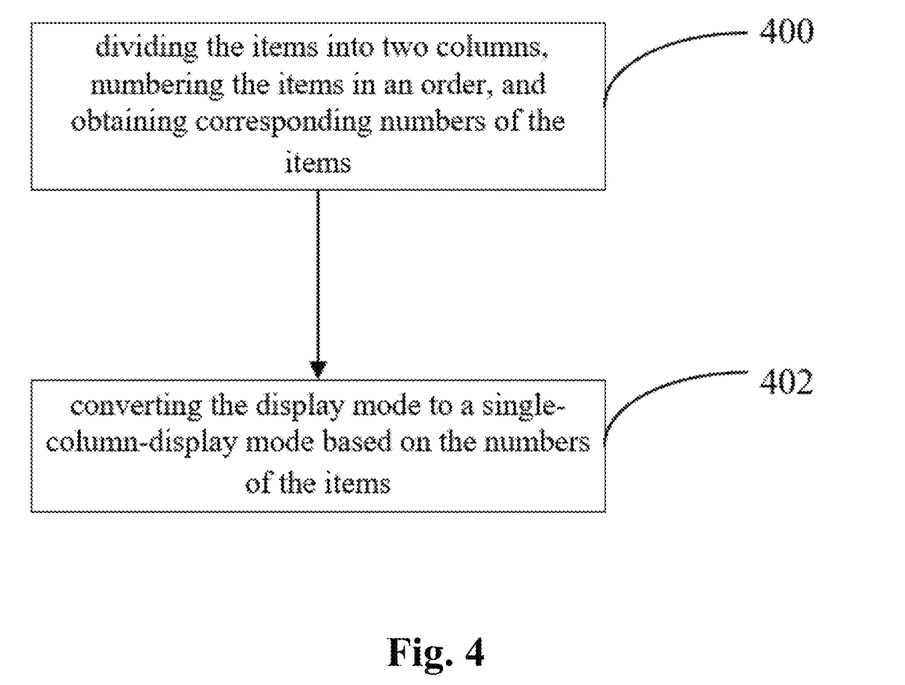
FIG. 4 is a schematic diagram illustrating another example process of adjusting the display mode of the first list to become the second list in accordance with the present disclosure.

In one exemplary embodiment, as illustrated in FIG. 4, the block 204 may further include block 400 and block 402.

At block 400, dividing the items into two columns; numbering the items in sequence based on predetermined rules, such as numbering the items from left to right and from top to bottom; and obtaining sequence numbers of the items.

At block 402, converting the display mode to a single-column-display mode based on the sequence numbers of the items.

Figure 5:
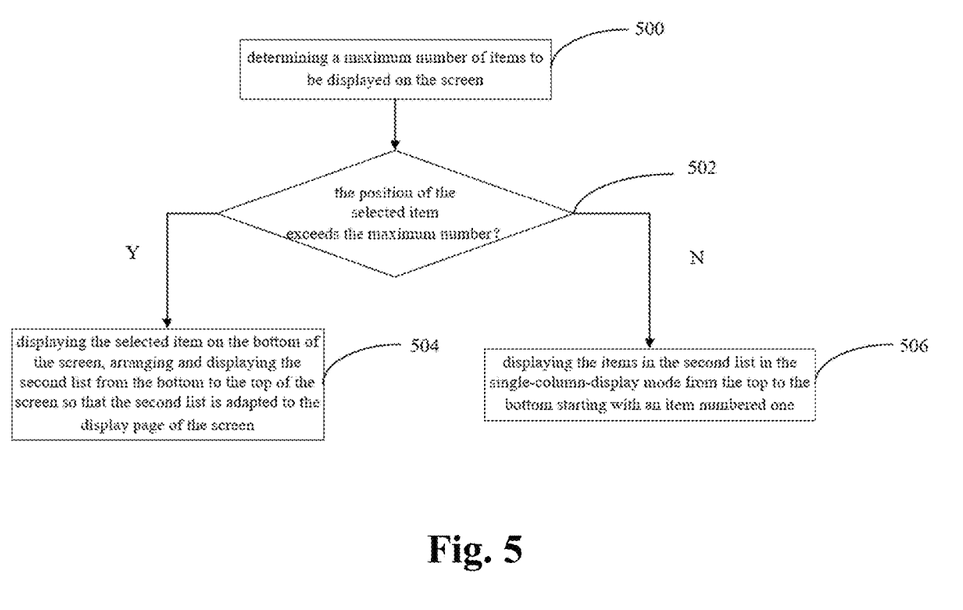
FIG. 5 is a schematic diagram illustrating another example process of determining a display range of the second list according to the position in accordance with the present disclosure.

In one exemplary embodiment, as illustrated in FIG. 5, the block 302 may include blocks 500~506.

At block 500, determining the maximum number of rows of the second list in the display page.

At block 502, determining whether the position of the selected item in the second list exceeds the maximum number according to the position, when the position exceeds the maximum number, a block 504 is executed; when the position does not exceed the maximum number, a block 506 is executed.

At block 504, displaying the selected item on the bottom of the display page, and arranging and displaying the second list from the bottom to the top according to the position, so that the second list is adapted to the display page.

At block 506, displaying the items in the second list in the single-column-display mode from the top to the bottom starting with an item numbered one according to the position, so that the second list is adapted to the display page.

Another example method of adjusting a list display in accordance with the present disclosure may further comprises, after blocks 200~204 of FIG. 2, displaying a third list in the display mode of the first list according to the position of the selected item in the second list.

Figure 6:
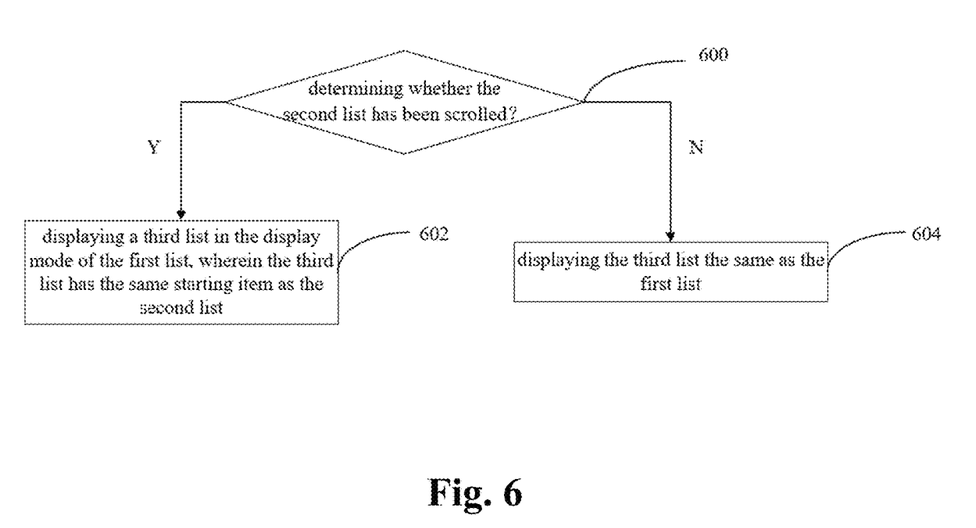
FIG. 6 is a schematic diagram illustrating another example process of displaying a third list in the display mode of the first list according to the position of the selected item in the second list in accordance with the present disclosure.

In one exemplary embodiment, as illustrated in FIG. 6, the displaying a third list in the display mode of the first list according to the position of the selected item in the second list may further include blocks 600~604.

At block 600, determining whether the second list has been scrolled, when the second list has been scrolled, a block 602 is executed; when the second list has not been scrolled, a block 604 is executed.

At block 602, displaying the third list in the display mode of the first list, wherein the third list has the same starting item as the second list.

At block 604, displaying the third list exactly the same as the first list.

Figure 7:
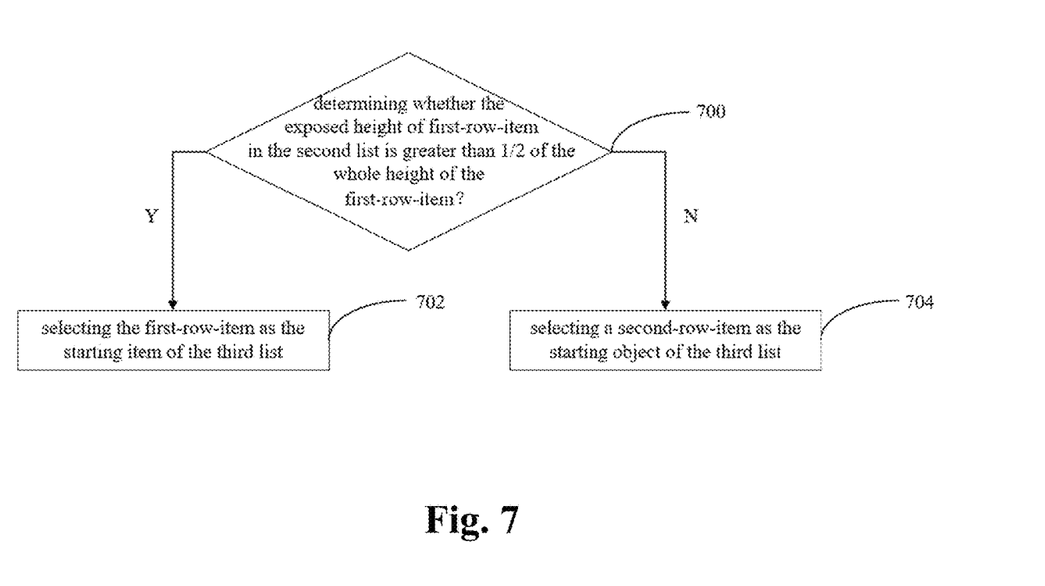
FIG. 7 is a schematic diagram illustrating another example process of a determining way of a starting item in accordance with the present disclosure.

In one exemplary embodiment, as illustrated in FIG. 7, determining a starting item of the third list may include blocks 700~704.

At block 700, determining whether the exposed height of first-row-item in the second list is greater than ½ of the whole height of the first-row-items, when the exposed height is greater than ½ of the whole height, a block 702 is executed; when the exposed height is less than or equal to ½ of the whole height, a block 704 is executed.

At block 702, selecting the first-row-item as the starting item of the third list.

At block 704, selecting a second-row-items as the starting item of the third list.

In this disclosure, a computing device of adjusting content display based on a selected item is also disclosed, and the computing device includes at least one processor and at least one memory. A computer program is stored on the at least memory, and when the computer program is executed by the at least one processor, the content display adjustment method based on a selected item is implemented. A computer readable storage medium is also disclosed, including computer program. When the computer program is executed by a processor, the content display adjustment method based on a selected item is implemented.

In an actual application, a specific implementation manner of a content display adjustment method based on a selected item is illustrated by the following embodiments.

Embodiment 1

Figure 8:
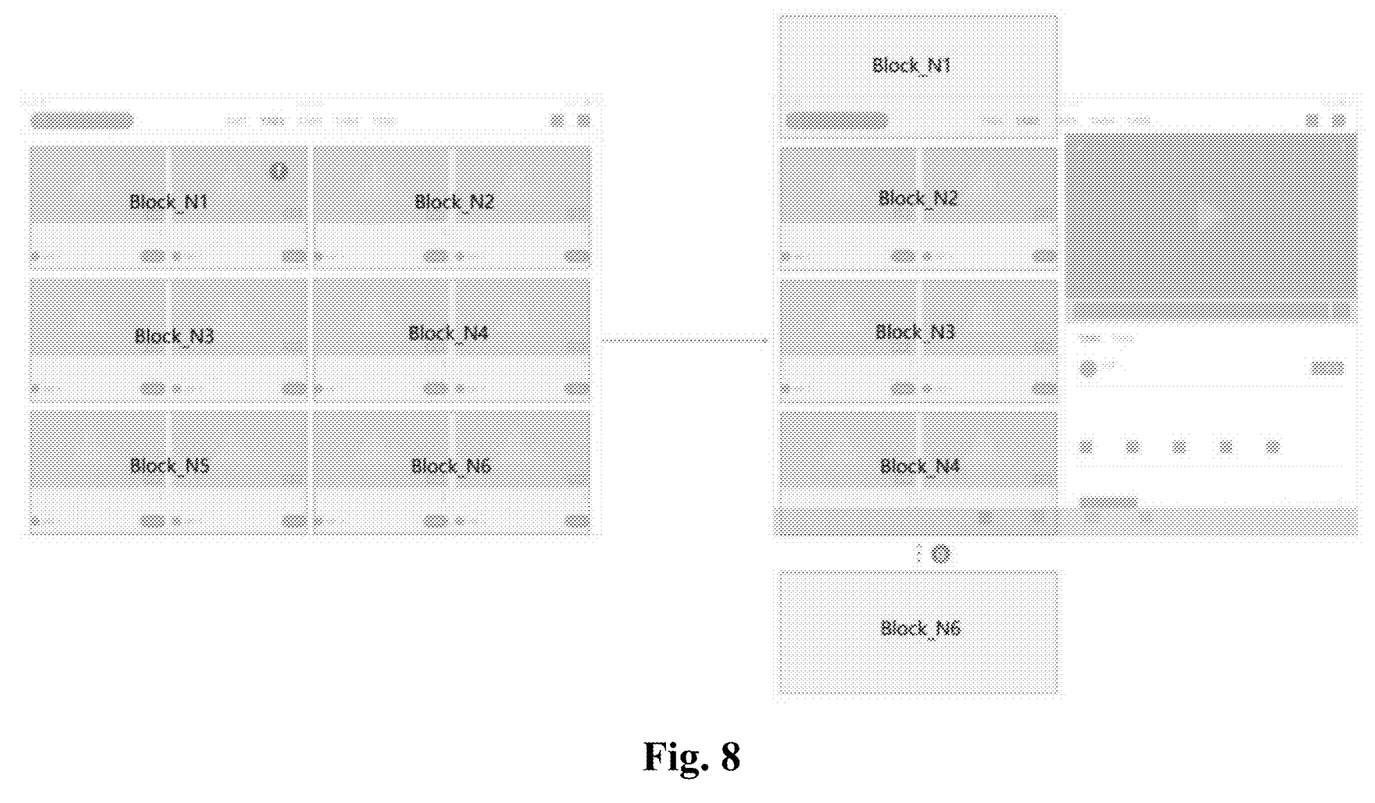
FIG. 8 is a schematic diagram illustrating an exemplary graphic of an adjustment process of the list display.

In this embodiment, a process illustrating an example process for adjusting content display based on a selected item is as follows:

As shown in FIG. 8, a schematic diagram illustrating an exemplary graphic of an adjustment process of the content display is disclosed. As shown in FIG. 8, in the embodiment, an original list (i.e., the first list) is arranged in a manner of 3 rows*4 columns. In order to implement the above-described display adjustment method based on the selected item, in this embodiment, firstly, the original list is divided into two columns. That is, two adjacent items in each row of the original list are grouped into a group, so that 12 items in the original list are divided into 6 groups, and the 6 groups of items are sequentially numbered from left to right and top to bottom. Then the 12 items are sorted according to the above process. Results after numbering can be clearly seen from FIG. 8.

It should be noted that the original arrangement of the original list in this embodiment is only an example. In practical applications, the numbers of rows and the numbers of columns in the original list are not fixed, and they can be determined according to actual conditions. When a total of columns is an even number, the original list can be divided into two columns according to the above process.

Secondly, after the 6 groups of items are numbered, when an item is selected, the original list is converted to show in a single-column-display mode, that is, the divided groups are arranged according to the number starting numbered 1 and from the top to the bottom, and an arranged result can be seen from FIG. 8. Due to a limited size of a display page, all the items of the original list cannot be displayed on the page when the list is shown in the single-column-display manner. In order to ensure that the selected item can be displayed in an adjusted list (i.e., the second list), a display mode of the adjusted list needs to be further adjusted.

Figure 9:
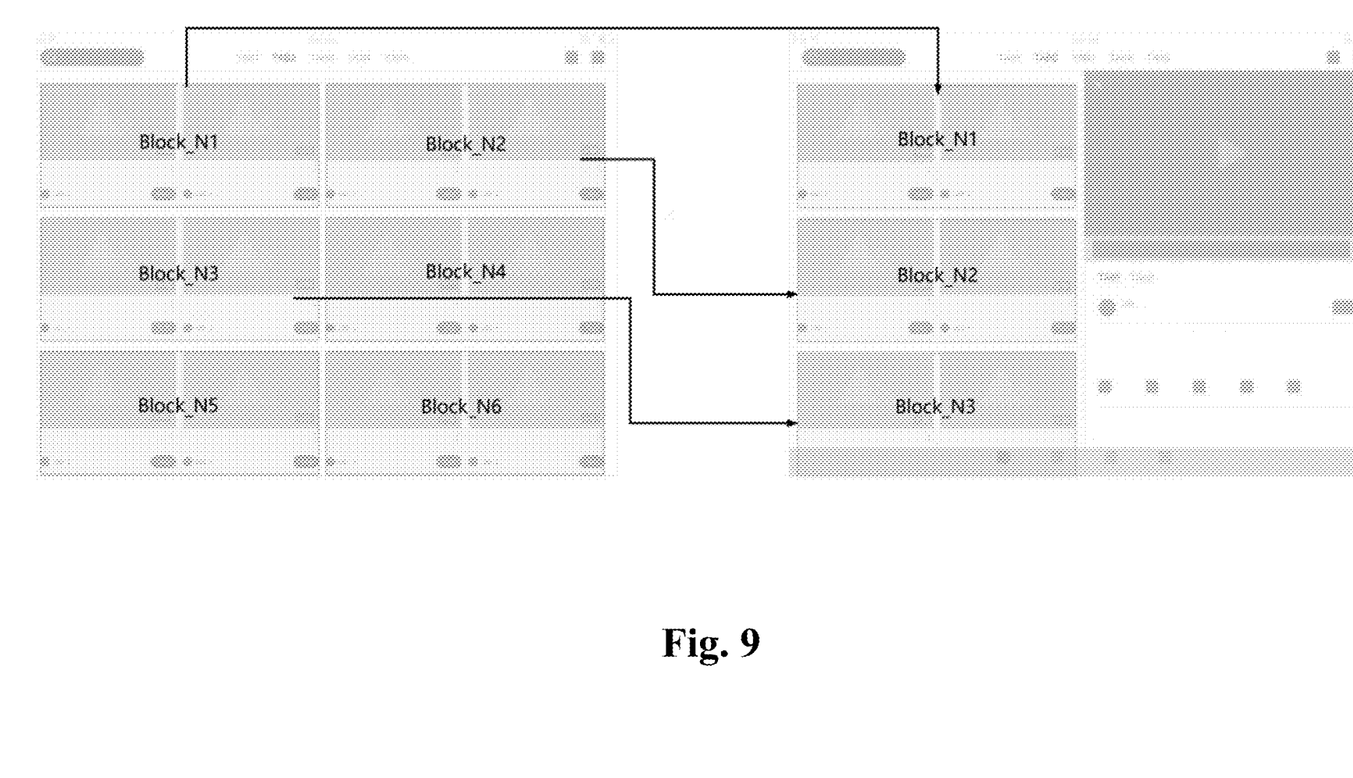
FIG. 9 is a schematic diagram illustrating an exemplary graphic of the adjustment when the position of the selected item in the second list does not exceed the maximum number rows of the second list in the list adjustment process.
Figure 10:
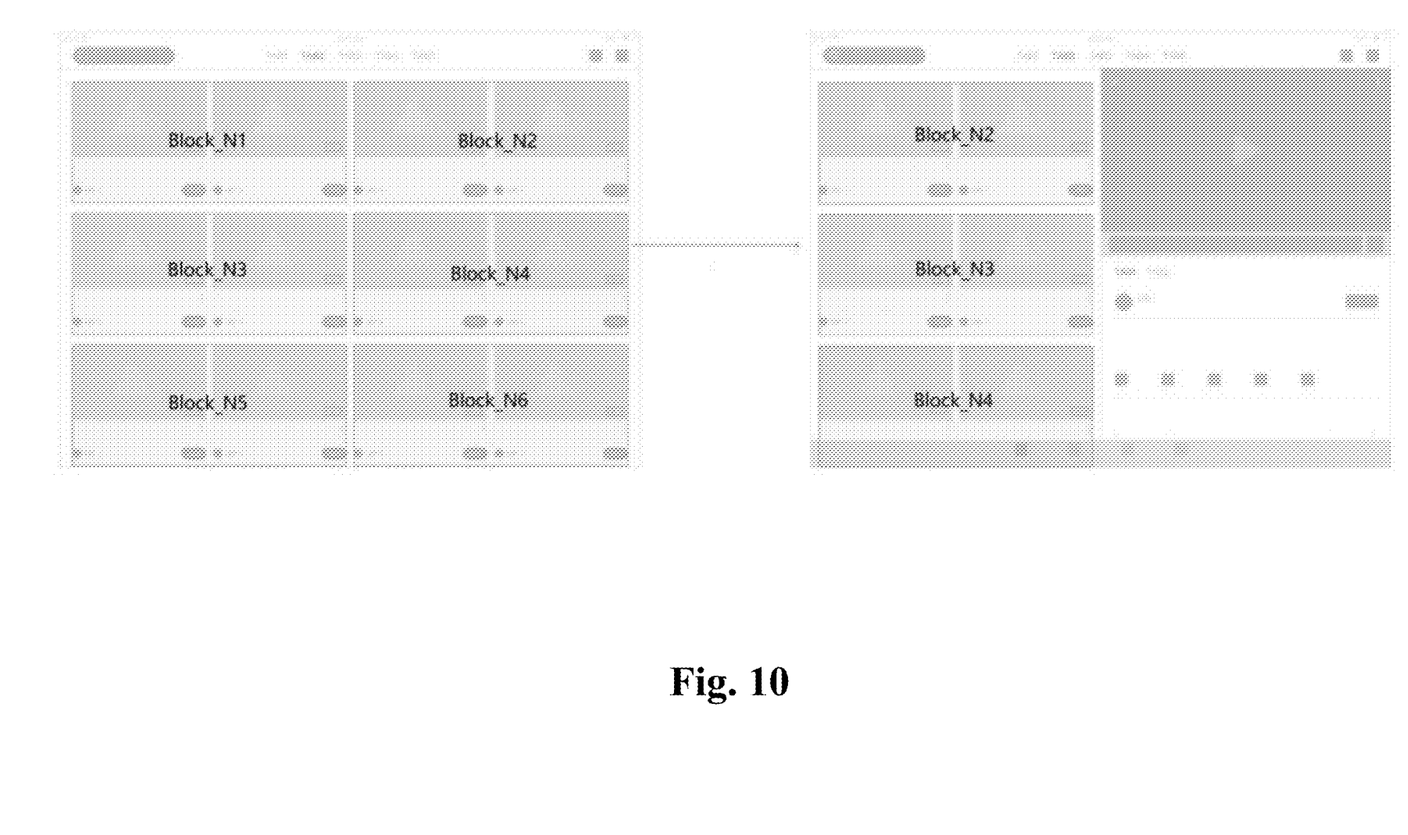
FIG. 10 is a schematic diagram illustrating an exemplary graphic of the adjustment when the position of the selected item in the second list exceeds the maximum number rows of the second list in the list adjustment process.

As shown in FIG. 8, since the space for displaying is limited, the maximum number of rows of the adjusted list to be displayed on the screen is first determined. As can be seen from FIG. 8, in the embodiment, up to three rows of items can be displayed in the display screen. Since each item has already been numbered before, it can be inferred whether the position of the selected item in the single-column list exceeds the maximum number of rows according to the number. When the position does not exceed the maximum number, the single-column list is displayed from the beginning (that is an item numbered 1) as illustrated in FIG. 9. At this time, the selected item must be visually displayed in the adjusted list. When the position exceeds the maximum number, as illustrated in FIG. 10, the selected item is displayed on the bottom of the display screen and then adjacent rows are displayed from the bottom to the top according to the sequence of numbering.

As illustrated in FIG. 14, when the sequence number of the selected item is 1, 2 or 3, after the original list is adjusted to show in the single-column-display mode, a single-column list starts with an item numbered 1 is displayed directly, then the selected item must be visually displayed in the adjusted list. As shown in FIG. 10, when the sequence number of the selected item exceeds 3, for example, the sequence number of the selected item is 4, a first group in which the selected item is located is displayed as the last row in the single-column list, then a second group numbered 3 is displayed above the first group, then a third group numbered 2 is displayed above the second group. Through such a process, the display adjustment of the adjusted list can be completed, so that the size of the adjusted list is adapted to the actual situation of the display page, and the selected item can be visually displayed on the current display page. It is convenient for users to track the selected item.

Embodiment 2

A display adjustment method based on a selected item in the embodiment is basically the same as that in the embodiment 1. The difference between the embodiment 1 and embodiment 2 is that, in this embodiment, after the list is adjusted to the single-column display, the user selects to return to the original display mode. In order to make the selected item can be still visually displayed in the display page, it is necessary to perform focus tracking again, that is, looking up a starting item in the single-column list.

In this embodiment, a determination basis of the starting item is: determining whether a height of an exposed portion of the first row of the single-column list exceeds ½ of a whole height of the row in the single-column list of the display page (the determination basis for determining the starting item is not unique, for example, an exposed height can be less than ½, other parameters may also be determined by the user according to the actual situation). When the exposed height is greater than ½ of the whole height, a grouping result corresponding to the first row is taken as the starting item. When the exposed height is less than or equal to ½ of the whole height, a grouping result corresponding to the second row is taken as the starting item.

Figure 12:
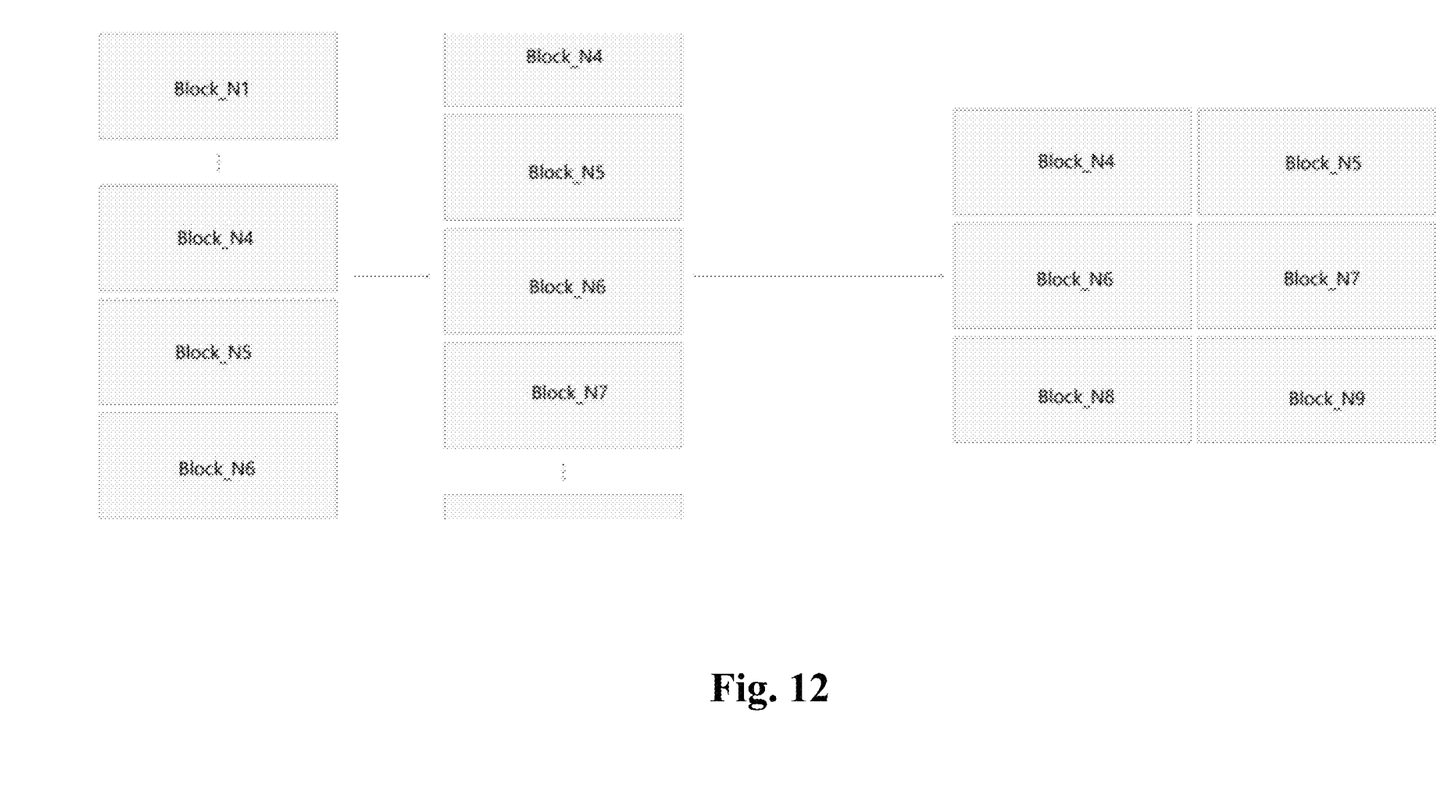
FIG. 12 is a schematic diagram illustrating an exemplary graphic of adjusting the second list to the third list in the display mode of the first list when the second list is scrolled.

After the starting item of the returned list (i.e., the third list) is determined, the starting item is taken as the first item in a returned page after a return operation by the user, and an inverse operation of the list adjustment is performed. As shown in FIG. 12, it restores the list in the original display mode, as the sequence number of items that can be displayed in the list of the original display mode exceeds the maximum number of rows of the items that can be displayed in the single-column list, and the starting item in the list of original display mode after restoration (i.e., the third list) is the same as the starting item in the single-column list (i.e., the second list), so the selected item in the single-column list must appear in the third list in the original display mode, so that the selected item can still be tracked during the restoration process, and loss of focus cannot be disappear.

Embodiment 3

Figure 11:
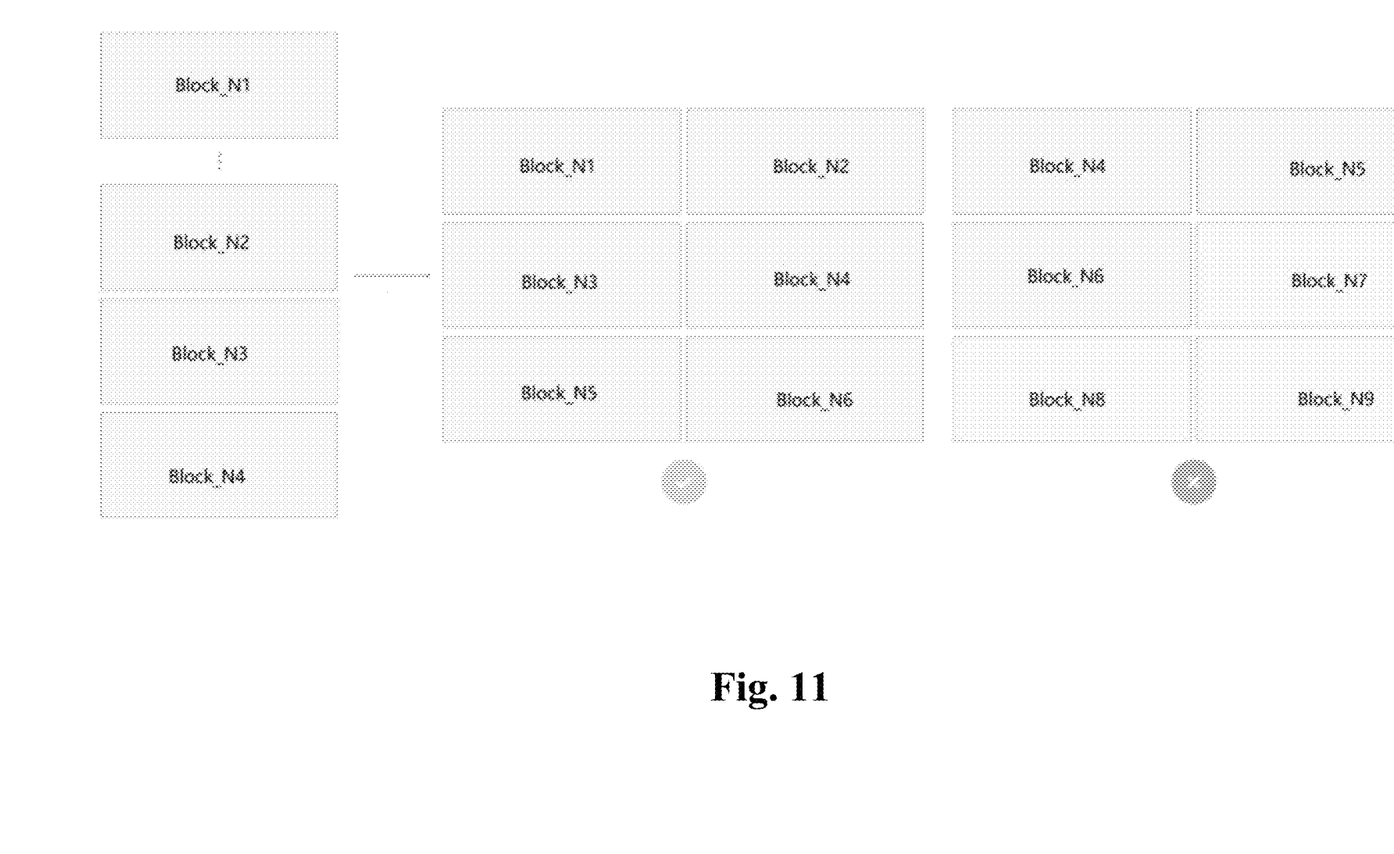
FIG. 11 is a schematic diagram illustrating an exemplary graphic of adjusting the second list to the third list in the display mode of the first list when the second list is not scrolled.

A display adjustment method based on a selected item in the embodiment is basically the same as that in the embodiment 2. The difference between the embodiment 2 and embodiment 3 is that, in this embodiment, after the original list is converted to the single-column list, no scrolling operation is performed on the single-column list, that is, the display of the single-column list has not changed, as shown in FIG. 11. If the single-column list is returned to the original display mode, the result is the same as the original list (i.e., the first list). In this case, there is no need to determine the starting item of the single-column list and it will directly return to the original display mode. In this way, it can reduce the workload of calculation and improve the adjustment efficiency.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method of simultaneously displaying a list of items and content associated with a selected item on a same screen, comprising:
generating and displaying an original list of search results, the original list of search results comprising a plurality of items, and the plurality of items displayed in different columns of the original list;
detecting a selection of an item among the plurality of items;
obtaining webpage content associated with the selected item;
automatically converting a display mode of the search results comprising the plurality of items in the different columns to a single-column mode in response to the selection of the item among the plurality of items, wherein the automatically converting of a display mode of the search results in response to the selection of the item further comprises:
automatically adjusting the original list of the search results comprising the plurality of items to generate a second list that comprises a single column of a subset of the plurality of items, wherein the subset of the plurality of items comprises the item selected from the plurality of items, and wherein the automatically adjusting the original list to generate the second list further comprises determining the subset of the plurality of items based at least in part on a position of the selected item in the plurality of items;
automatically displaying the second list comprising the single column of the subset of the plurality of items and the webpage content associated with based on the selected item on the same screen, wherein the second list is a list of the subset of the plurality of items comprising the selected item, and the second list is not a list of the webpage content associated with based on the selected item;
wherein the method further comprises:
changing the display mode from the single-column mode back to a previous mode; and
after changing the display mode back to the previous mode wherein the plurality of items are displayed in different columns of the original list, displaying items among the plurality of items in the previous mode based on the position of the selected item in the plurality of items, wherein an initial item displayed in the previous mode remains the same as an initial one displayed in the single-column mode, and wherein the items displayed in the previous mode comprise the selected item.

2. The method of claim 1, further comprising:
numbering the plurality of items based on one or more predetermined rules.

3. The method of claim 2, further comprising:
determining the position of the selected item in the plurality of items based on the numbering of the plurality of items.

4. The method of claim 3, further comprising:
determining a maximum number of rows to be displayed on the screen; and
determining whether a corresponding number of the selected item exceeds the maximum number of rows to be displayed.

5. The method of claim 4, further comprising:
in response to a determination that the corresponding number of the selected item exceeds the maximum number of rows to be displayed, displaying the selected item at a bottom of the screen and displaying other items among the plurality of items up to a top of the screen based on their respective numbers of the selected item and the other items.

6. The method of claim 4, further comprising:
in response to a determination that the corresponding number of the selected item does not exceed the maximum number of rows to be displayed, displaying items among the plurality of items from a top to a bottom of the screen based on their respective numbers of the items, wherein the displayed items comprise the selected item.

7. A system of simultaneously displaying a list of items and content associated with a selected item on a same screen, comprising:
at least one processor; and
at least one memory communicatively coupled to the at least one processor and storing instructions that upon execution by the at least one processor cause the system to:
generate and display an original list of search results, the original list of search results comprising a plurality of items, and the plurality of items displayed in different columns of the original list;
detect a selection of an item among the plurality of items;
obtain webpage content associated with the selected item;
automatically convert a display mode of the search results comprising the plurality of items in the different columns to a single-column mode in response to the selection of the item among the plurality of items, wherein automatically converting of a display mode of the search results in response to the selection of the item further comprises:
automatically adjusting the original list of the search results comprising the plurality of items to generate a second list that comprises a single column of a subset of the plurality of items, wherein the subset of the plurality of items comprises the item selected from the plurality of items, and wherein the automatically adjusting the original list to generate the second list further comprises determining the subset of the plurality of items based at least in part on a position of the selected item in the plurality of items;
automatically display the second list comprising the single column of the subset of the plurality of items and the webpage content associated with the selected item on the same screen, wherein the second list is a list of the subset of the plurality of items comprising the selected item, and the second list is not a list of the webpage content associated with the selected item;
wherein the at least one memory further stores instructions that upon execution by the at least one processor cause the system to:
change the display mode from the single-column mode back to a previous mode; and
after changing the display mode back to the previous mode wherein the plurality of items are displayed in different columns of the original list, display items among the plurality of items in the previous mode based on the position of the selected item in the plurality of items, wherein an initial item displayed in the previous mode remains the same as an initial one displayed in the single-column mode, and wherein the items displayed in the previous mode comprise the selected item.

8. The system of claim 7, the at least one memory further storing instructions that upon execution by the at least one processor cause the system to:
number the plurality of items based on one or more predetermined rules.

9. The system of claim 8, the at least one memory further storing instructions that upon execution by the at least one processor cause the system to:
determine the position of the selected item in the plurality of items based on the numbering of the plurality of items.

10. The system of claim 9, the at least one memory further storing instructions that upon execution by the at least one processor cause the system to:
determine a maximum number of rows to be displayed on the screen; and
determine whether a corresponding number of the selected item exceeds the maximum number of rows to be displayed.

11. The system of claim 10, the at least one memory further storing instructions that upon execution by the at least one processor cause the system to:
in response to a determination that the corresponding number of the selected item exceeds the maximum number of rows to be displayed, display the selected item at a bottom of the screen and display other items among the plurality of items up to a top of the screen based on their respective numbers of the selected item and the other items.

12. The system of claim 10, the at least one memory further storing instructions that upon execution by the at least one processor cause the system to:
in response to a determination that the corresponding number of the selected item does not exceed the maximum number of rows to be displayed, display items among the plurality of items from a top to a bottom of the screen based on their respective numbers of the items, wherein the displayed items comprise the selected item.

13. A non-transitory computer-readable storage medium bearing computer-readable instructions that upon execution on a computing device cause the computing device at least to:
generate and display an original list of search results, the original list of search results comprising a plurality of items, and the plurality of items displayed in different columns of the original list;
detect a selection of an item among the plurality of items;
obtain webpage content associated with the selected item;
automatically convert a display mode of the search results comprising the plurality of items in the different columns to a single-column mode in response to the selection of the item among the plurality of items, wherein automatically converting of a display mode of the search results in response to the selection of the item further comprises:
automatically adjusting the original list of the search results comprising the plurality of items to generate a second list that comprises a single column of a subset of the plurality of items, wherein the subset of the plurality of items comprises the item selected from the plurality of items, and wherein the automatically adjusting the original list to generate the second list further comprises determining the subset of the plurality of items based at least in part on a position of the selected item in the plurality of items;

automatically display the second list comprising the single column of the subset of the plurality of items and the webpage content associated with the selected item on the same screen, wherein the second list is a list of the subset of the plurality of items comprising the selected item, and the second list is not a list of the webpage content associated with the selected item;

wherein the non-transitory computer-readable storage medium further stores computer-readable instructions that upon execution on the computing device cause the computing device at least to:

change the display mode from the single-column mode back to a previous mode; and after changing the display mode back to the previous mode wherein the plurality of items are displayed in different columns of the original list, display items among the plurality of items in the previous mode based on the position of the selected item in the plurality of items, wherein an initial item displayed in the previous mode remains the same as an initial one displayed in the single-column mode, and wherein the items displayed in the previous mode comprise the selected item.

14. The non-transitory computer-readable storage medium of claim 13, further comprising computer-readable instructions that upon execution on the computing device cause the computing device at least to:

number the plurality of items based on one or more predetermined rules.

15. The non-transitory computer-readable storage medium of claim 14, further comprising computer-readable instructions that upon execution on the computing device cause the computing device at least to:

determine the position of the selected item in the plurality of items based on the numbering of the plurality of items.

16. The non-transitory computer-readable storage medium of claim 15, further comprising computer-readable instructions that upon execution on the computing device cause the computing device at least to:

determine a maximum number of rows to be displayed on the screen; and determine whether a corresponding number of the selected item exceeds the maximum number of rows to be displayed.

17. The non-transitory computer-readable storage medium of claim 16, further comprising computer-readable instructions that upon execution on the computing device cause the computing device at least to:

in response to a determination that the corresponding number of the selected item exceeds the maximum number of rows to be displayed, display the selected item at a bottom of the screen and display other items among the plurality of items up to a top of the screen based on their respective numbers of the selected item and the other items.

18. The non-transitory computer-readable storage medium of claim 16, further comprising computer-readable instructions that upon execution on the computing device cause the computing device at least to:

in response to a determination that the corresponding number of the selected item does not exceed the maximum number of rows to be displayed, display items among the plurality of items from a top to a bottom of the screen based on their respective numbers of the items, wherein the displayed items comprise the selected item.

\* \* \* \* \*